United States Patent
Watanuki et al.

(10) Patent No.: US 6,977,885 B1
(45) Date of Patent: Dec. 20, 2005

(54) PACKET TRANSMITTING AND RECEIVING METHOD AND APPARATUS THEREFOR

(75) Inventors: Tatsuya Watanuki, Ebina (JP); Toshikazu Yasue, Chigasaki (JP); Kazuko Iwatsuki, Kawasaki (JP); Ken Watanabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 789 days.

(21) Appl. No.: 09/642,612

(22) Filed: Aug. 17, 2000

(30) Foreign Application Priority Data

Aug. 25, 1999 (JP) .............................. P11-237846

(51) Int. Cl.⁷ ............................................. G01R 31/08
(52) U.S. Cl. ...................... 370/216; 370/217; 370/220; 370/225
(58) Field of Search ................................ 370/229, 235, 370/235.1, 236, 239, 300, 351, 357, 400, 370/401, 437, 438, 464, 465, 473, 474, 479, 370/489, 492, 496, 498, 502, 503, 522, 529, 370/536, 542, 353, 254, 389, 396, 407, 469, 370/455, 230, 231, 232, 233, 234, 237, 238, 370/240, 216, 217, 219, 220, 225, 227, 228, 370/242, 243, 244, 245, 248, 250; 709/204; 379/142.07

(56) References Cited

U.S. PATENT DOCUMENTS

| | | | | |
|---|---|---|---|---|
| 4,550,402 A | * | 10/1985 | Gable et al. ................ | 370/438 |
| 4,726,018 A | * | 2/1988 | Bux et al. .................... | 370/455 |
| 5,155,845 A | * | 10/1992 | Beal et al. ...................... | 714/6 |
| 5,255,264 A | * | 10/1993 | Cotton et al. ............... | 370/286 |
| 5,392,285 A | * | 2/1995 | Kurts .......................... | 370/407 |
| 5,457,680 A | * | 10/1995 | Kamm et al. ............... | 370/332 |
| 5,469,434 A | * | 11/1995 | Kurdzo et al. .............. | 370/364 |
| 5,596,569 A | * | 1/1997 | Madonna et al. ........... | 370/217 |
| 5,734,654 A | * | 3/1998 | Shirai et al. ................. | 370/396 |
| 5,796,717 A | * | 8/1998 | Shinbashi et al. .......... | 370/216 |
| 6,181,704 B1 | * | 1/2001 | Drottar et al. .............. | 370/410 |
| 6,222,827 B1 | * | 4/2001 | Grant et al. ................. | 370/254 |

(Continued)

FOREIGN PATENT DOCUMENTS

JP 06334638 12/1994 ............. H04L 1/22

(Continued)

OTHER PUBLICATIONS

IEEE Draft P802.3ad/D2.0 "Supplement to Carrier Sense Multiple Access with Collision Detection (CSMA/CD) Access Method & Physical Layer Specifications" Jul. 17, 1999 by the Institute of Electrical and Electronics Engineers, Inc., pp. 1-117.

(Continued)

*Primary Examiner*—Phirin Sam
(74) *Attorney, Agent, or Firm*—Townsend and Townsend and Crew LLP (57) ABSTRACT

According to the present invention, an information network wherein, packets can be forwarded between entities on a network along a plurality of lines, each line carrying separate copies of information. If a portion of one copy of the information is lost due to line failure, for example, other copies flowing along different lines can be used to reconstruct the lost information. In a representative embodiment, a plurality of LAN lines respectively connect between terminals and LAN-to-LAN forwarding devices or between two LAN-to-LAN forwarding devices. The terminals or the LAN-to-LAN forwarding devices are respectively provided with multiple line transmitting units for respectively transmitting the same packets to the plurality of LAN lines substantially contemporaneously. There are also provided multiple line receiving units for respectively selecting any of the same packets sent from the plurality of LAN lines and receiving it.

10 Claims, 9 Drawing Sheets

U.S. PATENT DOCUMENTS

| | | | |
|---|---|---|---|
| 6,222,841 B1 * | 4/2001 | Taniguchi | 370/389 |
| 6,240,105 B1 * | 5/2001 | Zetts | 370/503 |
| 6,263,059 B1 * | 7/2001 | Asai | 379/142.07 |
| 6,330,248 B1 * | 12/2001 | Krishna et al. | 370/447 |
| 6,411,617 B1 * | 6/2002 | Kilkki et al. | 370/353 |
| 6,456,597 B1 * | 9/2002 | Bare | 370/252 |
| 6,466,582 B2 * | 10/2002 | Venters et al. | 370/462 |
| 6,490,246 B2 * | 12/2002 | Fukushima et al. | 370/220 |
| 6,526,052 B1 * | 2/2003 | Rijhsinghani et al. | 370/389 |
| 6,625,119 B1 * | 9/2003 | Schuster et al. | 370/230 |
| 6,628,609 B2 * | 9/2003 | Chapman et al. | 370/229 |
| 6,754,181 B1 * | 6/2004 | Elliott et al. | 370/252 |
| 6,757,297 B1 * | 6/2004 | Chin | 370/469 |
| 6,763,371 B1 * | 7/2004 | Jandel | 709/204 |
| 2004/0100952 A1 * | 5/2004 | Boucher et al. | 370/389 |

FOREIGN PATENT DOCUMENTS

| | | | |
|---|---|---|---|
| JP | 08149114 | 6/1996 | H04L 1/22 |
| JP | 09326783 | 12/1997 | H04L 1/22 |

OTHER PUBLICATIONS

"High Availability and Scalability in the Network Core", Technical Paper by 3 Com, pp. 1 thru 6 (1998).

* cited by examiner

PACKET TRANSMITTING AND RECEIVING METHOD AND APPARATUS THEREFOR

CROSS-REFERENCES TO RELATED APPLICATIONS

This application claims priority from Japanese Patent Application Reference No. P11-237846, filed Aug. 25, 1999.

FIELD OF THE INVENTION

The present invention relates generally to line aggregating techniques, and particularly to a packet transmitting and receiving techniques for providing improved communications availability.

BACKGROUND OF THE INVENTION

In the field of information communications, conventional line aggregating techniques are used to connect between network apparatuses such as two LAN (Local Area Network) switches or the like, or between a terminal such as a server and a network apparatus. Such line aggregating techniques use a plurality of physical lines for the purpose of connecting between the network apparatuses or between the terminal and the network apparatus to improve availability.

One line aggregating technique, known as "link aggregation" is described in an IEEE (Institute of Electrical and Electronics Engineers) 802.3ad draft publication, for example.

In an example link aggregation system, a plurality of LAN lines (e.g., Ethernet or the like) connect between two LAN switches. Packets transmitted from LAN switches to LAN lines respectively are load-distributed in accordance with an algorithm such as a round robin algorithm and transmitted onto their corresponding LAN lines different from one another.

Now consider where a failure or trouble such as a line break occurs in any of aggregated LAN lines. In this case, a LAN switch is changed over so that a packet to be originally transmitted to a LAN line in which the failure has occurred, is transmitted through the use of the remaining LAN lines without the transmission of the packet to the LAN line with the failure developed therein, thereby allowing communications to continue.

While certain perceived advantages exist, the availability of communication lines between the two LAN switches can be improved.

Thus, what is needed are techniques for improved availability of a network system constructed using network apparatuses or terminals.

SUMMARY OF THE INVENTION

According to the present invention, an information networking technique wherein, packets can be forwarded between entities on a network along a plurality of lines, each line carrying separate copies of information is provided. If a portion of one copy of the information is lost due to line failure, for example, other copies flowing along different lines can be used to reconstruct the lost information. In a representative embodiment, a plurality of LAN lines respectively connect between terminals and LAN-to-LAN forwarding devices or between two LAN-to-LAN forwarding devices. The terminals or the LAN-to-LAN forwarding devices are respectively provided with multiple line transmitting units for respectively transmitting the same packets to the plurality of LAN lines substantially contemporaneously. There are also provided multiple line receiving units for respectively selecting any of the same packets sent from the plurality of LAN lines and receiving it. Embodiments are especially effective for application to a network connecting devices, such as a router, a LAN switch or the like, or a terminal, such as a server, for example.

An object of the present invention is to effectively process packets even when lost packets occur. Another object of the present invention is to provide a line aggregating technique capable of implementing the aggregation of a plurality of physical lines for the purpose of improving availability.

In a representative embodiment according to the present invention, a device on the transmitting side substantially contemporaneously transmits packets having the same contents (hereinafter called same) to a plurality of physical lines. Upon such transmission, for example, packets to which identifier information unique to each packet is added, are prepared according to the number of a plurality of physical lines and then transmitted. The device on the receiving side selects one of the same packets sent from the plurality of physical lines and receives it. Thus, even when a failure or trouble such as a line break occurs in any of the plurality of physical lines and thereby the loss of some packets occurs, the packets transmitted through the failure-free physical lines are not lost. Accordingly, the packets transmitted from the device on the transmitting side can be more reliably relayed to the device on the receiving side.

Numerous benefits are achieved by way of the present invention over conventional techniques.

In a specific embodiment according to the present invention, the same information is prepared in a plurality of packets, and the plurality of packets are transmitted to a plurality of physical lines. Thus, even when losses in packets occur, information within the packets can be effectively processed. It is also possible to implement the aggregation of a plurality of physical lines for improving availability.

These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

The present invention relates to techniques for providing improved transmission and reception of information between devices or apparatuses. Embodiments can provide improved performance with respect to conventional line aggregating techniques, for example. In specific embodiments, the devices on the transmitting and receiving sides respectively can comprise line controllers that control a plurality of physical lines according to a first layer (physical layer) of an OSI reference model, for example.

Link aggregation systems perform switching to the remaining LAN line upon occurrence of a failure or trouble such as a line break, for example, to continue the communicating, thereby making it possible to improve its availability.

However, in conventional link aggregation systems, losses in packets occur during a period from the occurrence of the failure to the time of the switching.

Described specifically, two devices, each of which has implemented a link aggregation system, swap control messages with each other in order to monitor a failure or trouble such as the breaking of each LAN line. The time involved in the exchange of control messages is on the order of seconds, in a representative example. Accordingly, the time of the order of seconds would be spent up to the completion of switching upon the occurrence of a failure.

There is a possibility that this will lead to packet losses of the order of a few millions of packets as the maximum number in a representative example, when a gigabit Ethernet of IEEE802.3z is used as a LAN line, for example.

Since the time required to perform a switching process does not reach 0 (zero) even if the interval between control message replacing times is shortened, the packet losses cannot be prevented from occurring.

Thus, in conventional approaches to link aggregation systems, the possibility of an occurrence of a packet loss is relatively high. Consequently, the retransmission of packets under control of a higher level protocol, such as a TCP (Transport Control Protocol), for example, is carried out, which can further reduce the transfer efficiency of such systems.

Further, a significant technical problem arises in that when a UDP (User Datagram Protocol) is used as an upper protocol, there is also a possibility that even the retransmission of packets will not be carried out.

One technique for reducing the omission of data at the occurrence of a failure includes a current-system transmitting unit and a preliminary-system transmitting unit respectively, that output data in synch with each other. The respective outputted data are stored in their corresponding memories provided in association with the current-system transmission line and the preliminary-system transmission line. Errors in data transmitted from the current-system transmission line and the preliminary-system transmission line are monitored through the use of a BIP (Bit Interleaved Parity) type computation. Data in a data error-free system is selected in frame units from the memory corresponding to the system. Such techniques relate to time-division multiplexed systems and are especially concerned with a process at a data error. For a further description of such techniques, reference may be had to a Japanese Patent Laid-Open No. Hei 8-149114.

In another technique, signals are simultaneously outputted from the current-system transmitting side and the preliminary-system transmitting side. The phases of the respective systems can be compared on the receiving side to cancel the phase difference between their signals. However, such techniques provide for resolving a delay difference at the occurrence of a data error, but do not bear directly on problems associated with line breaks, and the like. For a further description of such techniques, reference may be had to a Japanese Patent Laid-Open No. Hei 6-334638.

Further, a technique of data line switching control can be used. According to this technique, data substantially similar to one transmitted from a current transmitting means is transmitted from a preliminary transmitting means with a predetermined delay time. Upon its transmission, a value counted for the purpose of detecting an error in data transfer is added to the data. On the receiving side, a current-system receiving unit and a preliminary-system receiving unit, respectively, detect errors individually. Systems can be selected according to their detection. However, such techniques relate to the errors in data and does not necessarily relate to line problems such as a line break, and the like. Further, such techniques make use of a delay time developed between the receptions of data by a currently-used line and a preliminary line. For a further description of such techniques, reference may be had to a Japanese Patent Laid-Open No. Hei 9-326783.

In a representative embodiment according to the present invention, packets can be prepared by adding identifier information unique to each packet. Copies of the same information can be sent by different physical lines in packets having corresponding identifiers. Then, the packets are substantially contemporaneously transmitted using the plurality of physical lines. When packets having the same identifier information added thereto are substantially contemporaneously sent from a plurality of physical lines, one is selected based on the identifier information and received. Then, the identifier information from the packet is stored in a corresponding packet information storage.

In a representative embodiment according to the present invention, the identifier information can be based upon, for example, sequential information, or FCS values of an Ethernet (Ethernet: trademark of Xerox corporation) frame, an IEEE802.3 frame, an IEEE802.5 Token Ring frame, an ANSI X3T9 FDDI frame, or a CRC value of an ANSI X3T9 Fiber Channel frame, for example. Other types of identifiers can be readily implemented by one of ordinary skill in the art without departing from the scope of the claimed invention.

When packet losses are incurred from physical lines in which a failure, such as a line break, for example, has occurred, identifier information of the lost packets is also lost. However, the device on the receiving side can obtain the same identifier information as the lost identifier information from packets transmitted through failure-free physical lines. Accordingly, the device on the receiving side is capable of receiving the same information as was contained in the lost packets, based on the same identifier information.

An apparatus in a specific embodiment according to the present invention comprises a packet storage in which received packets may be stored, for each of the plurality of physical lines. A mode flag for storing either a primary or a secondary mode therein is provided for each packet storage in association with the packet storage. When the mode flag stores the primary mode therein, the packet storage receives packets sent from the physical lines. On the other hand, when the mode flag stores the secondary mode therein, the packet storage abandons the packets.

In a specific embodiment, an apparatus according to the present invention can be provided with a line switching unit. When a failure occurs in a physical line corresponding to a mode flag set to a primary mode, the line switching unit changes the mode flag to a secondary mode. Further, the line switching unit changes the mode flag set to the secondary mode to the primary mode. Furthermore, the line switching unit compares packets stored in the packet storage and communicated through physical lines, each corresponding to the changed mode flag with one another. As a result of mutual comparisons, the line switching unit delivers mutually inconsistent packets to its corresponding upper-level protocol processor as received packets.

Even if the failure occurs in the physical line corresponding to the mode flag set to the primary mode and the loss of each packet occurs due to the process for switching between the primary and secondary modes, the same information as that contained in the lost packets can be received through the physical lines that correspond to the mode flag changed from the secondary mode to the primary mode.

Embodiments of the present invention will hereinafter be described with reference to the accompanying drawings.

Figure 1:
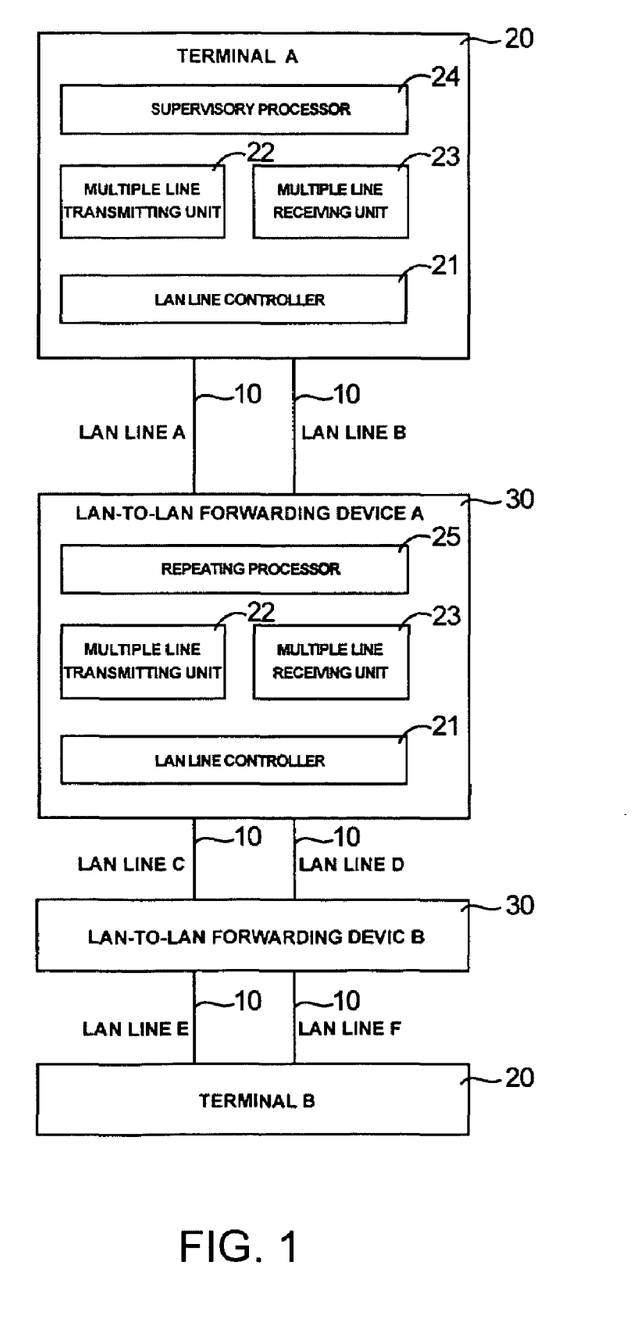
FIG. 1 illustrates a function block diagram showing examples of configurations of LAN-to-LAN forwarding devices, terminals and a network according to a particular embodiment according to the present invention.

FIG. 1 illustrates a conceptual view showing an example of a configuration of an information network including LAN-to-LAN repeating or forwarding devices and terminals in a representative embodiment according to the present invention.

The information network shown in FIG. 1 has a configuration wherein two terminals 20 (terminal A and terminal B), and two LAN-to-LAN forwarding devices 30 (LAN-to-LAN forwarding device A and LAN-to-LAN forwarding device B) are respectively connected to one another by LAN lines 10 (LAN line A, LAN line B, LAN line C, LAN line D, LAN line E and LAN line F) provided in a two by two configuration. The terminals 20 (terminal A and terminal B) and the LAN-to-LAN forwarding devices 30 are respectively provided with portions for connecting the LAN lines 10.

Each of the terminals 20 has a LAN line controller 21, a multiple line receiving unit 23, a multiple line transmitting unit 22, and an executive or supervisory processor 24. The LAN line controller 21 comprises hardware or the like which performs control of each of the LAN lines 10 in a first layer (physical layer) of an OSI reference model.

Figure 4:
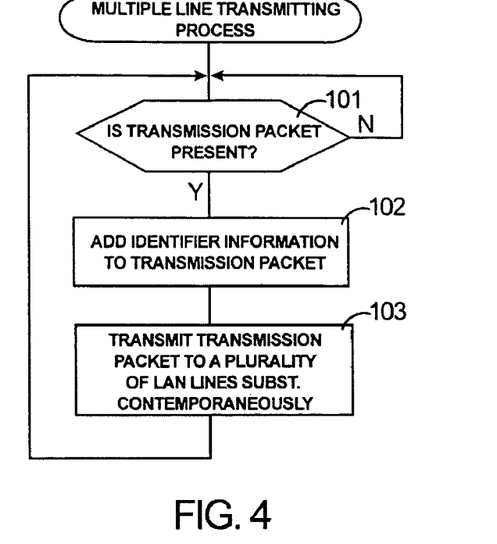
FIG. 4 illustrates a flowchart of representative processing by a multiple line transmitting unit employed in a particular embodiment according to the present invention.

The multiple line transmitting unit 22 comprises hardware or software or the like which performs a process for substantially contemporaneously transmitting the same packet to a plurality of the LAN lines 10 according to a process such as that illustrated by the flowchart shown in FIG. 4 to be described later, in a second layer (data link layer) of the OSI reference model.

Figure 2:
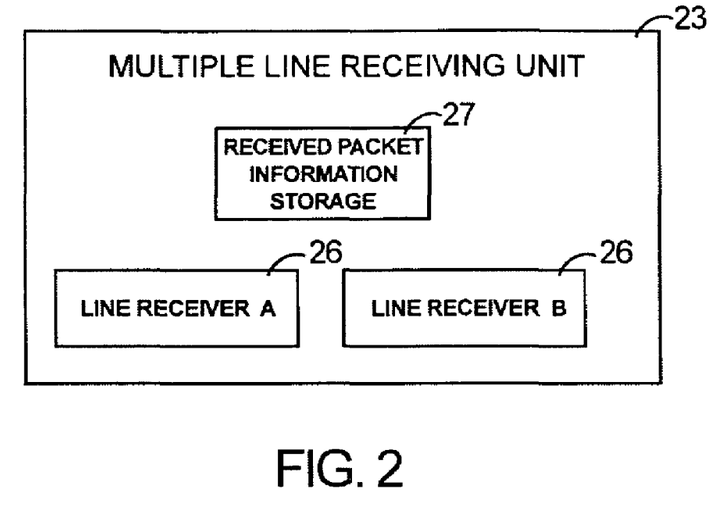
FIG. 2 illustrates a function block diagram depicting an example of a configuration of a multiple line receiving unit employed in a particular embodiment according to the present invention.

As shown in FIG. 2, the multiple line receiving unit 23 has two line receivers 26 (line receiver A and line receiver B) and a received packet information storage 27.

Figure 5:
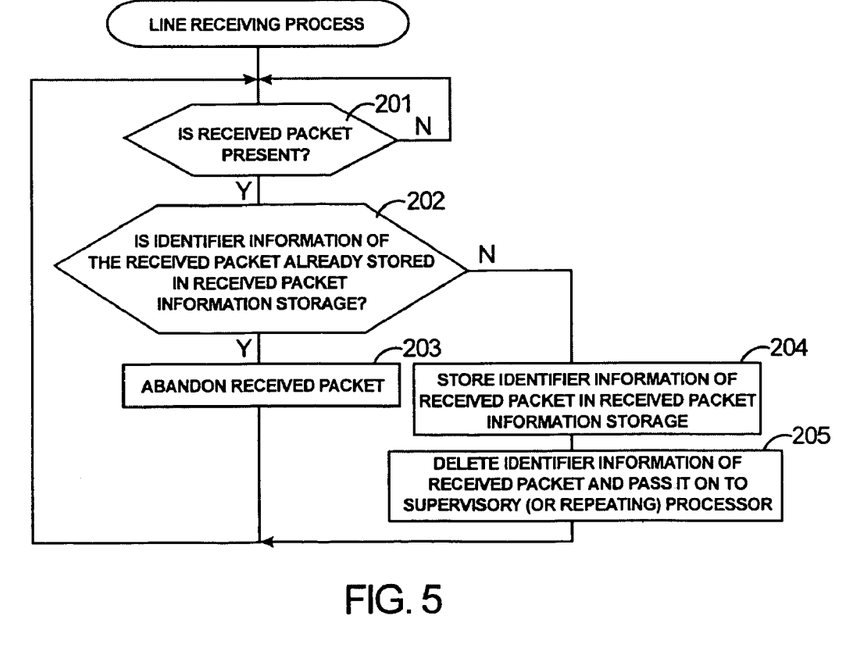
FIG. 5 illustrates a flowchart of representative processing by a line receiver employed in a particular embodiment according to the present invention.

Each of the line receivers 26 comprises hardware or software or the like which performs a process for receiving or abandoning a packet sent from each LAN line 10 according to a process such as that illustrate by the flowchart shown in FIG. 5 to be described later, in the second layer (data link layer) of the OSI reference model.

The line receiver 26 is provided for each LAN line 10. Since connections are made by the two LAN lines 10 in the present embodiment, the two line receivers 26 are provided. However, when the number of the LAN lines 10 is two or more, the line receivers 26 are also placed two or more. The respective line receivers 26 are provided every LAN lines 10.

Figure 3:
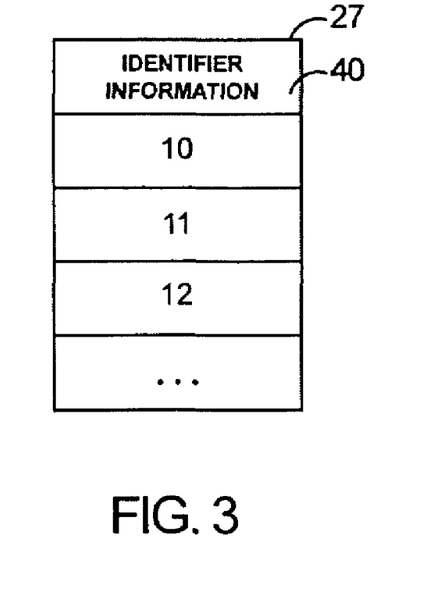
FIG. 3 illustrates a conceptual diagram depicting an example of a configuration of a received packet information storage employed in a particular embodiment according to the present invention.

As shown in FIG. 3, the received packet information storage 27 stores identifier information 40 added to each received packet therein.

The received packet information storage 27 does not store the identifier information 40 therein at its initial stage.

The supervisory processor 24 comprises software or the like which performs a process higher than that in a third layer (network layer) of the OSI reference model.

Each of the LAN-to-LAN forwarding devices 30 has a LAN line controller 21, a multiple line receiving unit 23, a multiple line transmitting unit 22, and a relay or repeating processor 25.

The LAN line controller 21, the multiple line receiving unit 23 and the multiple line transmitting unit 22 are those substantially similar to the LAN line controller 21, the multiple line receiving unit 23 and the multiple line transmitting unit 22 included in each terminal 20 referred to above.

The repeating processor 25 comprises hardware or software or the like which performs a process for relaying a packet to another LAN line 10, in a layer higher than the second layer (data link layer) of the OSI reference model.

One example of the operation of the information network shown in FIG. 1 will be described below.

The operation of the multiple line transmitting unit 22 will first be explained using the flowchart shown in FIG. 4.

The multiple line transmitting unit 22 monitors the presence or absence of each packet to be transmitted (Step 101). When the packets to be transmitted exist, the multiple line transmitting unit 22 adds identifier information to the transmitted packets (Step 102). The multiple line transmitting unit 22 substantially contemporaneously transmits the transmitted packets to a plurality of LAN lines 10 (Step 103).

Information unique for each packet, such as sequential information is used as the identifier information.

Figure 6:
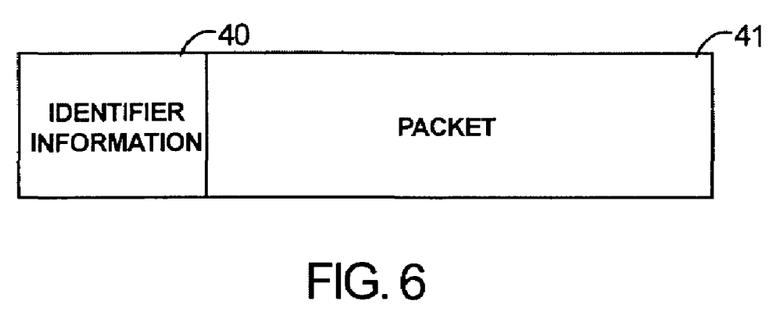
FIG. 6 illustrates a conceptual diagram showing an example of a configuration of a packet to which identifier information is added in a particular embodiment according to the present invention.

An example of a configuration of the packet to which the identifier information is added, is shown in FIG. 6.

While FIG. 6 shows the example in which identifier information 40 is added to a packet 41, the present invention is not necessarily limited to the example. The identifier information 40 may be added to the internal part of the packet 41, e.g., a header or the like.

The operation of each line receiver 26 will next be explained using a flowchart shown in FIG. 5.

The line receiver 26 monitors the presence or absence of each received packet (Step 201).

When the received packet is found to exist as a result of its monitoring, the line receiver 26 confirms whether the identifier information added to the received packet has already been stored in the received packet information storage 27 (Step 202).

When it is found from the result of confirmation that the identifier information has already been stored therein, the line receiver 26 abandons the received packet (Step 203).

On the other hand, when the result of confirmation indicates that the identifier information is not found to be stored therein, the identifier information 40 added to the received packet is stored in the received packet information storage 27 (Step 204). Thereafter, the line receiver 26 deletes the identifier information 40 and delivers the received packet to the supervisory processor 24 or the repeating processor 25 (Step 205). In specific embodiments, step 204 and step 205 may be performed concurrently, or may be performed in inverse order.

A description will be made below of a case in which in the information network shown in FIG. 1, the terminal A 20 transmits a packet to the terminal B 20.

At the terminal A 20, a request for the transmission of each packet is issued from the supervisory processor 24. In this case, the multiple line transmitting unit 22 adds the identifier information 40 (e.g., "10") to each of the packets to be transmitted (Step 102) and substantially contemporaneously transmits the packets to the two LAN lines 10 (LAN line A and LAN line B) (Step 103).

The LAN-to-LAN forwarding device A 30 performs a packet relaying or forwarding process. The multiple line receiving unit 23 receives the two same packets sent from the two LAN lines 10.

The line receiver 26 confirms whether the identifier information 40 (= "10") added to the packet is stored in the received packet information storage 27 (Step 202). When, for example, the line receiver A 26 executes the line receiver flow shown in FIG. 5 prior to the line receiver B 26, the identifier information 40 of the packet received by the line receiver A 26 is not yet stored in the receiving packet information storage 27. Accordingly, the line receiver A 26 causes the receiving packet information storage 27 to store the identifier information 40 (="10") therein (Step 204). The line receiver A 26 deletes the identifier information 40 from the received packet and delivers the so-processed packet to the repeating processor 25 (Step 205).

On the other hand, since the identifier information 40 (="10") is already stored in the received packet information storage 27 by the line receiver A 26, the line receiver B 26 abandons the received packet (Step 203).

As a result, the packet received by the line receiver A 26 is selected.

Further, the repeating processor 25 in the LAN-to-LAN forwarding device A 30 makes a request for transmission of a packet to the LAN-to-LAN forwarding device B 30.

The multiple line transmitting unit 22 newly adds identifier information 40 (e.g., "20") to packets to be transmitted (Step 102) and transmits the same to the two LAN lines 10 (LAN line C and LAN line D) (Step 103).

Subsequently, a process similar to the above is carried out by the LAN-to-LAN forwarding device B 30 to relay the packet to the terminal B 20.

At the terminal B 20, the multiple line receiving unit 23 receives packets from the two LAN lines 10 (Step 201), and either one of the line receivers 26 delivers or passes the corresponding received packet to the supervisory processor 24 (Step 205). The other line receiver 26 abandons the corresponding received packet (Step 203).

The packets are respectively relayed from the terminal A 20 to the terminal B 20 in the above-described manner.

If a failure or trouble occurs in the LAN line A 10, then the packet transmitted from the terminal A 20 is not relayed by the LAN line A 10. However, the same information is sent in a packet sent from the terminal A 20 that is relayed to the LAN-to-LAN forwarding device A 30 through the use of the LAN line B 10.

Thus, the LAN-to-LAN forwarding device A 30 is capable of receiving the packet from the LAN line B 10 and relaying it to the LAN-to-LAN forwarding device B 30. As a result, the same packet can be relayed to the terminal B 20.

Even when a failure occurs in either of the LAN lines 10 (LAN line C and LAN line D) provided between the LAN-to-LAN forwarding device A 30 and the LAN-to-LAN forwarding device B 30 and the LAN lines 10 (LAN line E and LAN line F) provided between the LAN-to-LAN forwarding device B 30 and the terminal B 20, this processing is carried out in the same manner as described above. Thus, the packets transmitted from the terminal A 20 are assuredly relayed to the terminal B 20.

In the present embodiment, the respective apparatuses or devices are connected to one another by the two LAN lines 10. However, the present embodiment is not limited to this example. Accordingly, two or more LAN lines 10 may be connected. In general, the greater the number of lines, the higher the reliability.

In the present embodiment, the addition of the unique identifier information 40, such as the sequential information, to each packet on the transmitting side allows selection of the packet on the receiving side. However, when an IEEE802.3, an Ethernet, or the like, is used for the LAN lines 10, an FCS (Frame Check Sequence) is automatically added to each of the packets.

The FCS is substantially unique for each packet. Thus, it is also possible to select the received packets by using the FCS. In this embodiment, operations are shown by flowcharts illustrated by FIGS. 7 and 8. Further, the FCS value is stored in the receiving packet information storage 27 in place of the identifier information 40. The respective parts will be described below.

Figure 7:
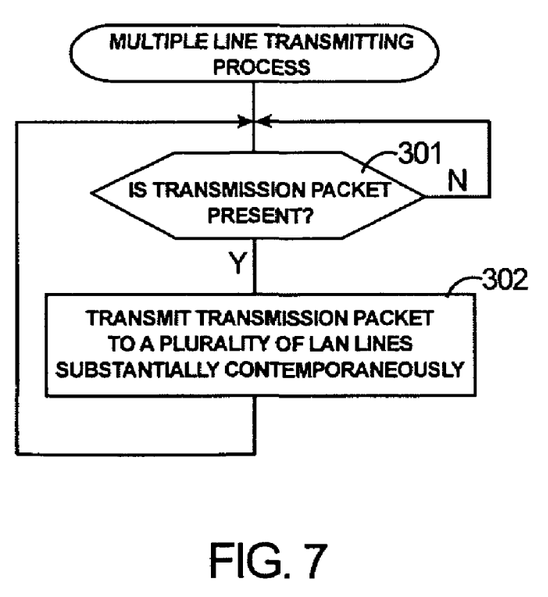
FIG. 7 illustrates a flowchart of representative processing by a multiple line transmitting unit employed in a particular embodiment according to the present invention.

As shown in FIG. 7, the multiple line transmitting unit 22 monitors the presence or absence of packets to be transmitted (Step 301). When it is found from the result of monitoring thereof that the packets to be transmitted exist, the multiple line transmitting unit 22 substantially contemporaneously transmits the same packets to a plurality of LAN lines 10 (Step 302).

Figure 8:
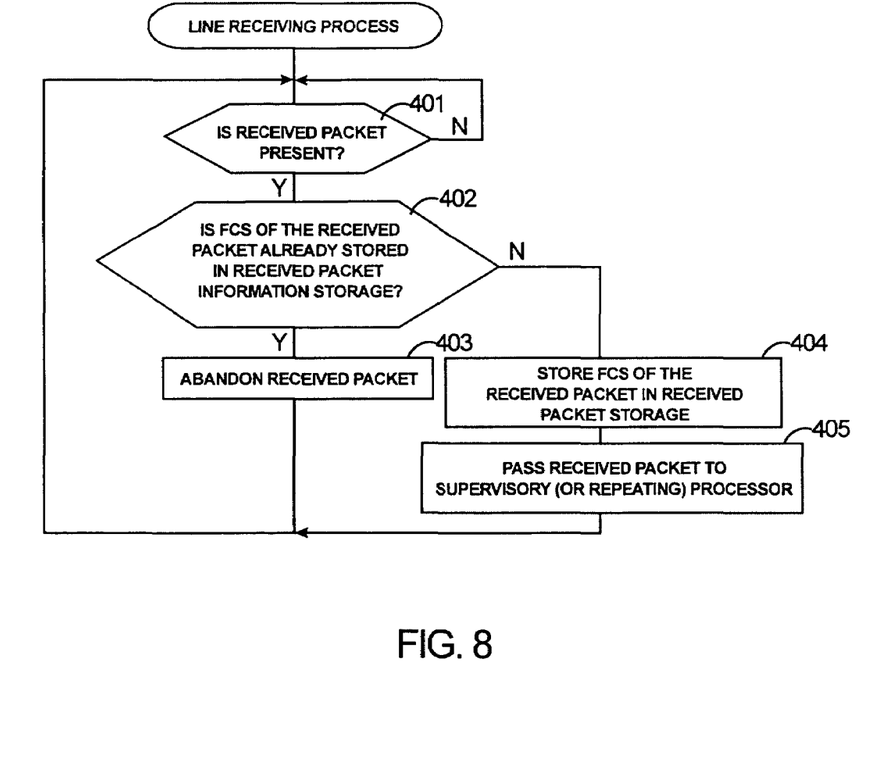
FIG. 8 illustrates a flowchart of representative processing by a line receiver employed in a particular embodiment according to the present invention.

As shown in FIG. 8, the line receiver 26 monitors the presence or absence of each received packet (Step 401). When the received packet is found to exist from the result of monitoring, the line receiver 26 confirms whether an FCS value of the received packet has already been stored in the received packet information storage 27 (Step 402). When it is found from the result of confirmation that the FCS value has already been stored therein, the line receiver 26 abandons the received packet (Step 403). On the other hand, when the FCS value is found not to be stored therein, the FCS value of each received packet is stored in the received packet information storage 27 (Step 404). Thereafter, the line receiver 26 delivers the received packet to the supervisory processor 24 or the repeating processor 25 (Step 405). In specific embodiments, (Step 404) and (Step 405) may be processed concurrently.

In such specific embodiments, the packets transmitted from the terminal A 20 are not lost even if a failure such as a line break occurs in any LAN line 10. Accordingly, the packets transmitted from the terminal A 20 are reliably relayed to the terminal B 20.

A result similar to above is obtained when each LAN line 10 is a LAN having specifications other than IEEE802.3 and Ethernet, such as a IEEE802.5 Token Ring, an ANSI (American National Standard Institute) X3T9 FDDI (Fiber Distributed Data Interface), or a Fiber Channel. Further, the LAN lines 10 are not limited to lines used for the transfer of data between full duplex communication systems. The LAN lines 10 are alike even in the case of lines used for the transfer of data between semi-duplex communication systems.

Another embodiment will next be explained. In another present embodiment, the likelihood of loss of a packet can be further reduced from occurring.

Figure 9:
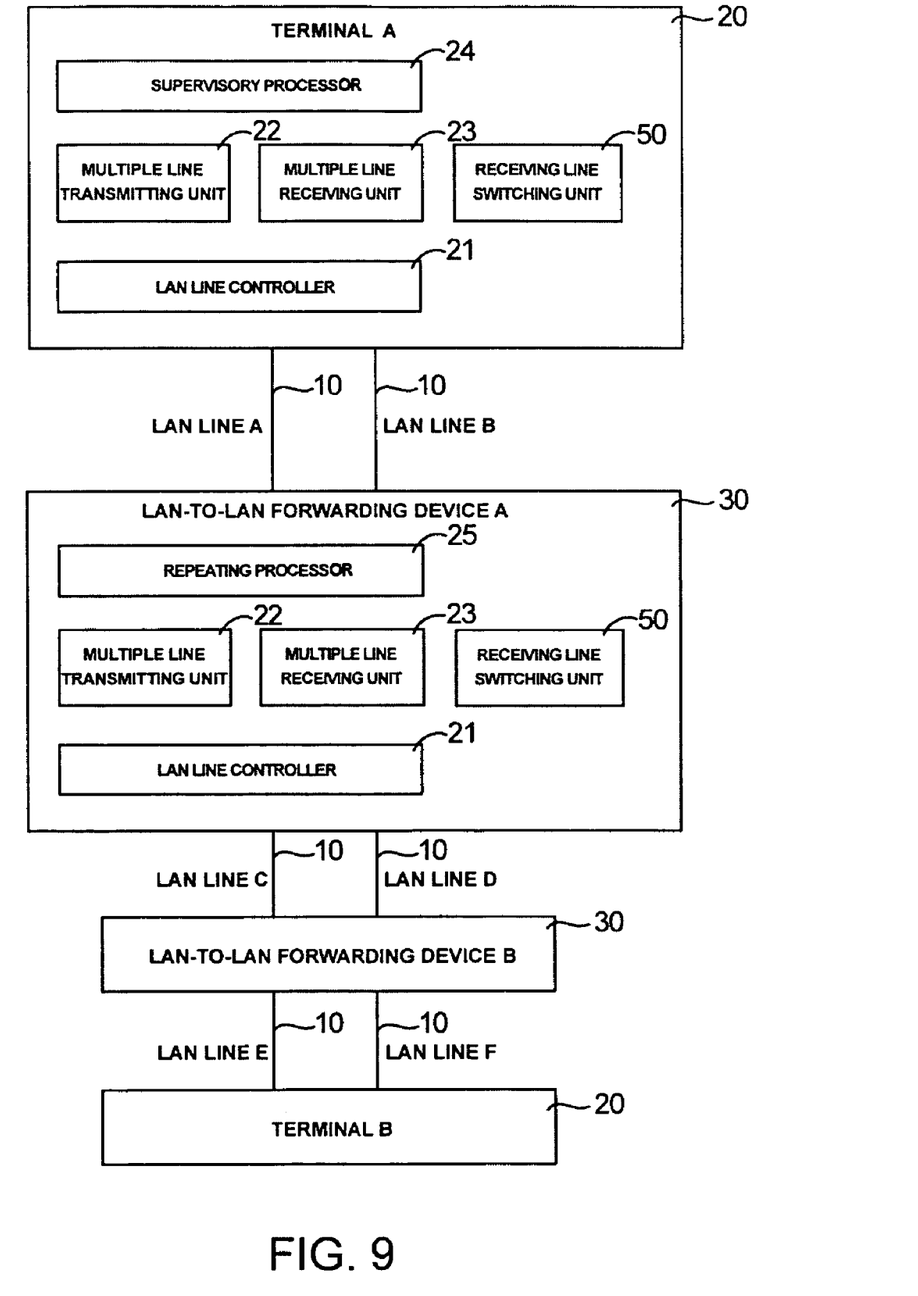
FIG. 9 illustrates a functional block diagram illustrating examples of configurations of LAN-to-LAN forwarding devices, terminals and a network according to a particular embodiment according to the present invention.

FIG. 9 shows a specific embodiment according to the present invention. FIG. 9 illustrates a conceptual view showing an example of a configuration of an information network having LAN-to-LAN forwarding devices 30 and terminals 20. In a manner similar to FIG. 1 described above, the information network shown in FIG. 9 has a configuration wherein two terminals 20 (terminal A and terminal B), and two LAN-to-LAN forwarding devices 30 (LAN-to-LAN forwarding device A and LAN-to-LAN forwarding device B) are respectively connected to one another by LAN lines 10 (LAN line A, LAN line B, LAN line C, LAN line D, LAN line E and LAN line F) provided in a two by two arrangement.

In the present embodiment, the multiple line receiving unit 23 illustrated in FIG. 9 further comprises a receiving line switching unit 50.

Other LAN line controller 21 and supervisory processor 24 are substantially similar to those already shown in FIG. 1. The multiple line transmitting unit 22 is substantially similar to one already shown in FIG. 7.

Figure 10:
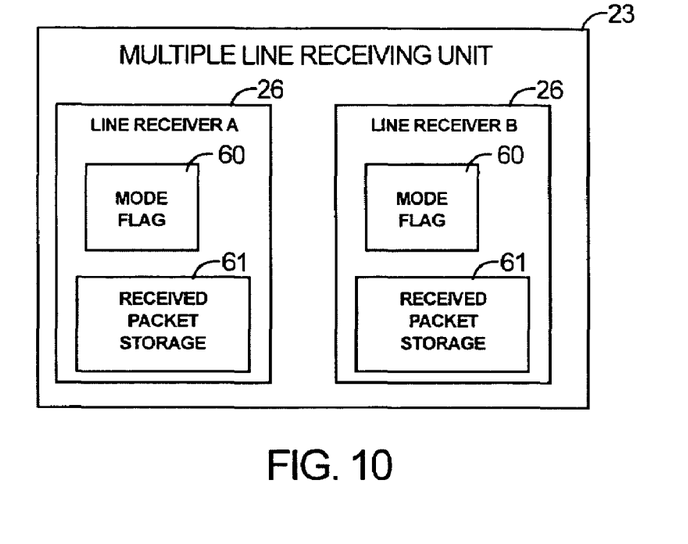
FIG. 10 illustrates a functional block diagram showing an example of a configuration of a multiple line receiving unit employed in a particular embodiment according to the present invention.

As shown in FIG. 10, the multiple line receiving unit 23 employed in the present embodiment comprises two line receivers 26 (line receiver A and line receiver B). Each of the line receivers 26 has a mode flag 60 and a received packet storage 61.

Figure 11:
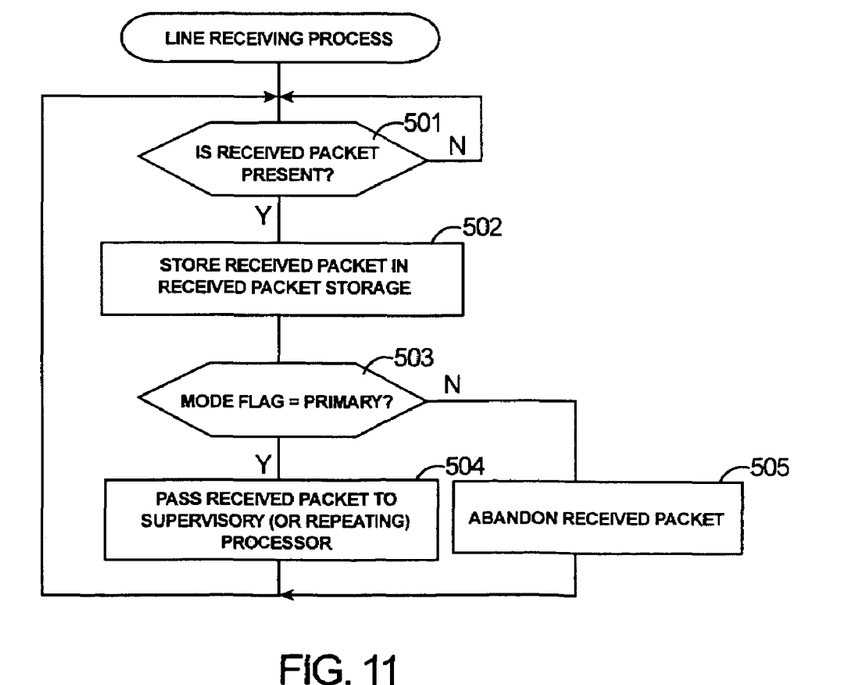
FIG. 11 illustrates a flowchart of representative processing by a line receiver employed in a particular embodiment according to the present invention.

The line receiver 26 performs a process such as that illustrated by the flowchart shown in FIG. 11 to be described later in a second layer (data link layer) of an OSI reference model. The line receiver 26 comprises hardware or software or the like which performs a process for receiving or abandoning a packet sent from each LAN line 10.

The mode flag 60 stores therein information indicative of whether the line receiver 26 is "Primary" or "Secondary".

The received packet storage 61 stores each received packet therein.

At an initial stage, "Primary" is stored in the mode flag 60 of either one of the two line receivers 26 as information, whereas "Secondary" is stored in the mode flag 60 of the other line receiver 26 as information.

In the present embodiment, "Primary" and "Secondary" will be defined as stored in the mode flag 60 in the line receiver A 26 and the mode flag 60 in the line receiver B 26 respectively.

The received packet storage 61 does not store the received packet therein at its initial stage.

Each of the LAN-to-LAN forwarding devices 30 has a LAN line controller 21, a multiple line receiving unit 23, a multiple line transmitting unit 22, a relay or repeating processor 25, and a receiving line switching unit 50.

The repeating processor 25 is substantially similar to one already shown in FIG. 1. The LAN line controller 21, the multiple line transmitting unit 22, the multiple line receiving unit 23 and the receiving line switching unit 50 are substantially similar to those included in the aforementioned terminal 20.

The operation of the present embodiment will be explained below.

The operation of each line receiver 26 will first be described using the flowchart shown in FIG. 11.

The line receiver 26 monitors the presence or absence of each received packet (Step 501).

When the received packet is found to exist from the result of monitoring, it is stored in the received packet storage 61 (Step 502).

The line receiver 26 confirms whether the mode flag 60 is "Primary" (Step 503).

When the mode flag 60 is found to be "Primary" from the result of confirmation, the line receiver 26 delivers the received packet to the supervisory processor 24 or the repeating processor 25 (Step 504).

On the other hand, when the mode flag 60 is found not to be "Primary", i.e., it is found to be "Secondary" from the result of confirmation, the line receiver 26 abandons the received packet (Step 505).

The operation of making the confirmation as to whether the mode flag 60 is "Primary", may be carried out as a process prior to (Step 501) or a process between (Step 501) and (Step 502) in specific embodiments according to the present invention.

Figure 12:
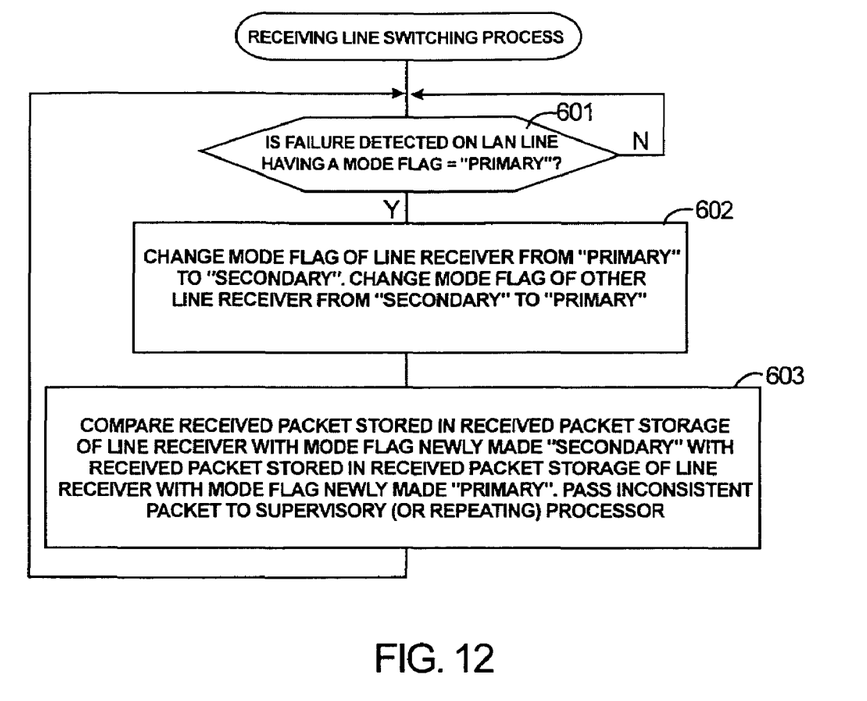
FIG. 12 illustrates a flowchart of representative processing by a receiving line switching unit employed in a particular embodiment according to the present invention.

The operation of the receiving line switching unit 50 will next be described using a flowchart shown in FIG. 12.

The receiving line switching unit 50 monitors the presence or absence of a failure or trouble such as a line break on each LAN line 10 where the mode flag 60 is set to "Primary" (Step 601).

When the failure is found to have been detected from the result of monitoring, the mode flag 60 of the line receiver 26 is changed to "Secondary" and the mode flag 60 of the other line receiver 26 is changed to "Primary" (Step 602).

The line receiver 26 changed to "Primary" at this time delivers or passes a received packet to the supervisory processor 24 or the repeating processor 25 in place of the other line receiver 26 changed to "Secondary".

Further, the receiving line switching unit 50 compares each received packet stored in the received packet storage 61 lying within the line receiver 26 changed to "Secondary" and each received packet stored in the received packet storage 61 lying within the line receiver 26 changed to "Primary". From the result of comparison, the receiving line switching unit 50 delivers each inconsistent packet, i.e., each packet undelivered to the supervisory processor 24 or the repeating processor 25 during a period up to the change of the other line receiver 26 to "Primary", to the supervisory processor 24 or the repeating processor 25 (Step 603).

A description will be made of an example case in which the terminal A 20 transmits packets to the terminal B 20 in the configuration of the information network shown in FIG. 9.

At the terminal A 20, a request for the transmission of each packet is issued from the supervisory processor 24. In this case, the multiple line transmitting unit 22 substantially contemporaneously transmits the packets to the two LAN lines 10 (LAN line A and LAN line B) in accordance with the flowchart shown in FIG. 7 (Step 302).

The multiple line receiving unit 23 in the LAN-to-LAN forwarding device A 30 receives the two same packets sent from the two LAN lines 10. The line receiver A 26, in which the mode flag 60 is "Primary", delivers the received packet to the repeating processor 25 (Step 504), after the received packet has been stored in the received packet storage 61 (Step 502).

Meanwhile, the line receiver B 26, in which the mode flag 60 is "Secondary", abandons the received packet (Step 505) after the received packet has been stored in the received packet storage 61 (Step 502).

Further, the repeating processor 25 in the LAN-to-LAN forwarding device A 30 makes a request for the transmission of each received packet to the LAN-to-LAN forwarding device B 30.

The multiple line transmitting unit 22 transmits the packets to the two LAN lines 10 (LAN line C and LAN line D) so that they are relayed to the LAN-to-LAN forwarding device B 30.

Subsequently, a process similar to the above is carried out by the LAN-to-LAN forwarding device B 30 and the packets are relayed to the terminal B 20.

At the terminal B 20, the line receiver 26 in the multiple line receiving unit 23, which is "Primary", delivers each received packet to the supervisory processor 24 (Step 504). On the other hand, the line receiver 26 set as "Secondary" abandons the received packet (Step 505).

The packets are relayed from the terminal A 20 to the terminal B 20 in the above-described manner.

A description will next be made of a case in which a failure or trouble occurs in each LAN line 10. In the present embodiment, a description will be made of a case in which a failure such as a line break occurs in the LAN line A 10 lying between the terminal A 20 and the LAN-to-LAN forwarding device A 30.

In the LAN-to-LAN forwarding device A 30, the receiving line switching unit 50 detects the failure developed in the LAN line A 10 (Step 601). Approximately contemporaneously with the failure's detection, the mode flag 60 of the line receiver A 26 is changed to "Secondary" and the mode flag 60 of the line receiver B 26 is changed to "Primary" (Step 602).

Subsequently, the line receiver B 26 receives a packet therein (Step 501) and is changed over so as to pass it to the repeating processor 25 (Step 504).

The receiving line switching unit 50 compares each received packet stored in the received packet storage 61 provided within the line receiver A 26 and each received packet stored in the received packet storage 61 provided within the line receiver B 26. As a result of comparison, the receiving line switching unit 50 passes the inconsistent packets to the repeating processor 25 (Step 603).

Thus, the packets undelivered to the repeating processor 25 during a period from the occurrence of the failure to the switching between the line receivers 26 are processed without any loss. As a result of such processing, the packets are reliably relayed to the terminal B 20.

If a failure now occurs in either of the LAN lines 10 (LAN line C and LAN line D) provided between the LAN-to-LAN forwarding device A 30 and the LAN-to-LAN forwarding device B 30 or either of the LAN lines 10 (LAN line E and LAN line F) provided between the LAN-to-LAN forwarding device B 30 and the terminal B 20, this processing is carried out in the same manner as described above. In this case, the packets transmitted from the terminal A 20 are assuredly relayed to the terminal B 20 without any loss.

The received packet storage 61 may preferably be a FIFO (First In First Out) type in terms of memory economy.

In the case of the line such as the Ethernet or the like, only identifier information such as an FCS value may be stored in each line receiver 26 to further economize on memory usage. In this case, the received packet storage 61 in the line receiver 26 set to "Primary" stores only the identifier information such as the FCS value added to each received packet therein. On the other hand, the line receiver 26 set to "Secondary" stores each packet therein. In place of the FCS value, identification information such as sequential information is added to each packet on the transmitting side, and the identification information may be stored in the line receiver set to "Primary".

In a specific embodiment, (Step 602) and (Step 603) may be interposed in sequence in the flowchart of the receiving line switching unit 50. In this case, the receiving line switching unit 50 compares each received packet stored in the received packet storage 61 lying within the line receiver 26 in which the present mode flag is "Primary" and each received packet stored in the received packet storage 61 lying within the line receiver 26 expected to be changed to "Primary" and being "Secondary" at present. As a result of this comparison, the receiving line switching unit 50 passes or delivers each inconsistent packet to the supervisory processor 24 or the repeating processor 25 as the received packet (Step 603). Afterwards, the receiving line switching unit 50 changes the mode flag 60 of the line receiver 26 being "Primary" at present to "Secondary" and changes the mode flag 60 of the other line receiver 26 to "Primary" (Step 602). Thus, there is no influence exerted on the sequence of reception of the packets undelivered to the supervisory processor 24 or the repeating processor 25 during a period up to the switching of the other line receiver 26 to "Primary". The receiving line switching unit 50 is capable of delivering the packets to the supervisory processor 24 or the repeating processor 25 in compliance with the received sequence of packets.

In a yet further embodiment, step 602 and step 603 of the aforementioned receiving line switching unit 50, may be processed concurrently.

Each of the line receivers 26 employed in the present embodiment includes the received packet storage 61.

In this case, another hardware such as a memory, software or the like used for performing management as FIFO, and the like may be needed in specific embodiments. In another alternative embodiment, implementation may be simplified by omitting the received packet storage 61. An example for such a case will be described below.

Figure 13:
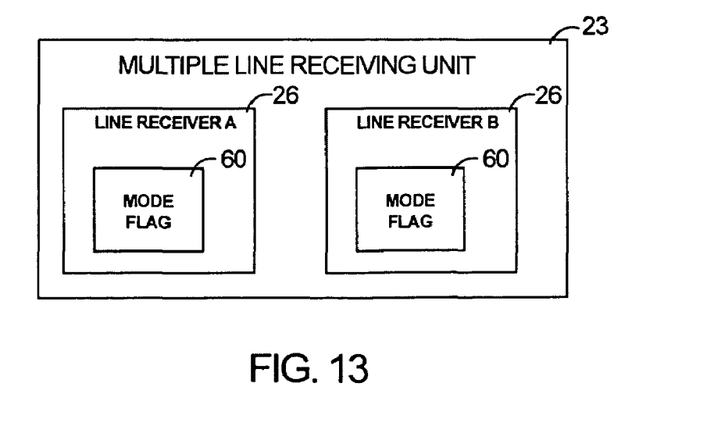
FIG. 13 illustrates a functional block diagram showing an example of a configuration of a multiple line receiving unit employed in a particular embodiment according to the present invention.

FIG. 13 shows a yet further embodiment according to the present invention. According to the present embodiment, the implementation of hardware can be simplified as compared with other embodiments according to the present invention.

FIG. 13 illustrates a conceptual view showing another example of a configuration of a multiple line receiving unit 23. As shown in FIG. 13, the multiple line receiving unit 23 comprises two line receivers 26 (line receiver A and line receiver B). Each of the line receivers 26 comprises a mode flag 60.

Figure 14:
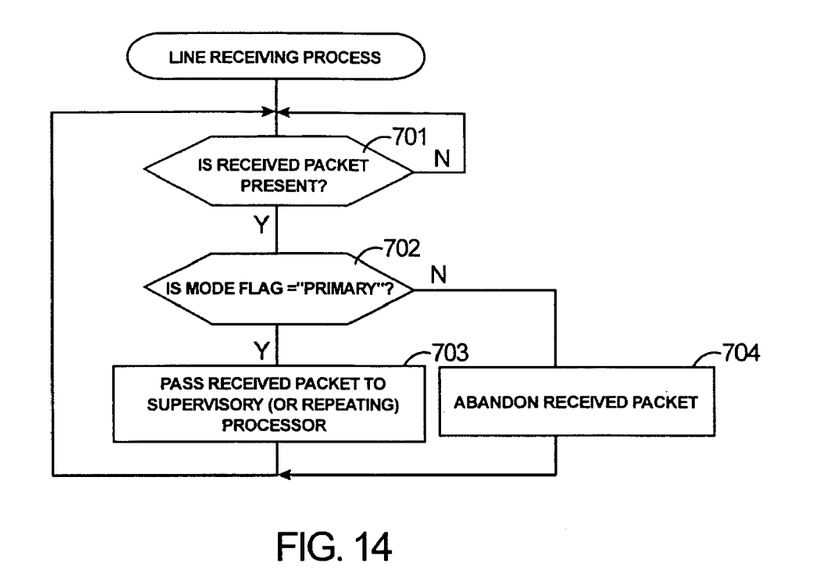
FIG. 14 illustrates a flowchart of representative processing by a line receiver employed in a particular embodiment according to the present invention.

The line receiver 26 performs a process such as that illustrated by the flowchart shown in FIG. 14, to be described later, in a second layer (data link layer) of an OSI reference model. The line receiver 26 comprises hardware or software or the like which performs a process for receiving or abandoning packets sent from a plurality of LAN lines 10 according to the above process.

The mode flag 60 is similar in function to that discussed herein above with respect to FIG. 10 and FIG. 11.

Figure 15:
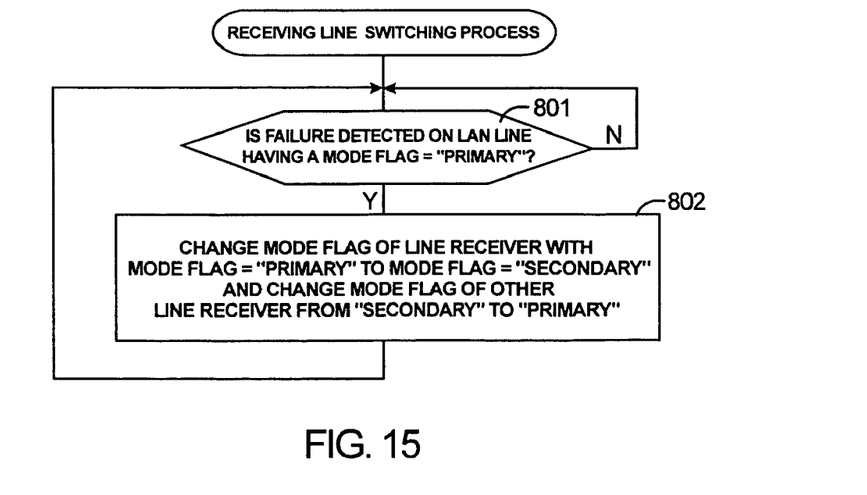
FIG. 15 illustrates a flowchart of representative processing by a receiving line switching unit employed in a particular embodiment according to the present invention.

In the present embodiment, representative processing of a receiving line switching unit 50 is illustrated by a flowchart shown in FIG. 15.

In specific embodiments, configurations of terminals 20 and LAN-to-LAN forwarding devices 30 are similar to those discussed herein above with respect to FIG. 9.

An example of the operation of a present embodiment will be explained below. The operation of each line receiver 26 will first be explained using the flowchart shown in FIG. 14.

The line receiver 26 monitors the presence or absence of each received packet (Step 701). When the received packet is found to exist from the result of monitoring, the line receiver 26 confirms whether the mode flag 60 is "Primary" (Step 702).

When the mode flag 60 is found to be "Primary" as a result of confirmation, the line receiver 26 delivers the received packet to an executive or supervisory processor 24 or a repeating processor 25 (Step 703).

On the other hand, when the mode flag 60 is found not to be "Primary" as a result of confirmation, i.e., it is found to be "Secondary", the line receiver 26 abandons the received packet (Step 704).

The operation of the receiving line switching unit 50 will next be explained using the flowchart shown in FIG. 15.

The receiving line switching unit 50 monitors the presence or absence of a failure or trouble, such as a line break, on each LAN line 10 in which the mode flag 60 is "Primary" (Step 801).

When the failure is found to have been detected from the result of monitoring, the mode flag 60 of the line receiver 26 is changed to "Secondary" and the mode flag 60 of the other line receiver 26 is changed to "Primary" (Step 802).

The line receiver 26 changed to "Primary" at this time is switched over so as to deliver or pass a received packet to the supervisory processor 24 or repeating processor 25 in place of the line receiver 26 changed to "Secondary".

Although packet loss cannot be prevented in the present embodiment, the implementation of hardware can be simplified as compared with other embodiments discussed herein above by eliminating the need for received packet storage 61.

Further, the shortening of the time from the detection of a failure to the switching between the line receivers 26 further reduces the probability that any particular packet will be lost.

According to the LAN-to-LAN forwarding device 30 or terminal 20 employed in the present embodiment as described above, even if a failure such as a line break occurs in each LAN line 10, communications can be carried out continuously. It is thus possible to construct a network system improved in availability.

Since a packet loss incident to processing for switching to another LAN line 10 does not occur as compared with the link aggregation system, it is possible to implement packet transfer with substantially improved efficiency in representative embodiments according to the present invention.

While the present invention has been described above using representative embodiments, the present invention is not limited to these embodiments. Those of ordinary skill in the art will appreciate that various changes can be made to the specific embodiments described herein without departing from the scope and substance of the present invention.

For example, lines intended for line aggregation in the present invention are not limited only to the LAN lines illustrated in these embodiments, but rather applicable to various lines.

Further, the LAN-to-LAN forwarding devices illustrated in the present embodiments normally indicate LAN switches, bridges, and the like. It can be appreciated however, by those of ordinary skill in the art that the LAN-to-LAN forwarding devices can be similarly applied even to a network apparatus such as a router which connects between a LAN and a WAN (Wide Area Network).

In this case, a network system having high availability can be constructed between the router and the LAN-to-LAN forwarding device such as the LAN switch or the like or between the router and a server or the like.

Further, the specific embodiments according to the present invention have been shown using the LAN-to-LAN forwarding devices and terminals. For example, a line aggregating technique of the present invention may be applied to a semiconductor device such as LSI (Large Scale Integration) and placed on a network interface card or the like. If a network system is constructed of terminals, or the like, each equipped with the network interface card in that case, those of ordinary skill in the art will appreciate that a similar benefit can be achieved.

In specific embodiments according to the present invention, it is possible to reduce or prevent packet loss as well as to aggregate lines allowing an improvement in availability.

In specific embodiments, a packet transfer of relatively high efficiency can be achieved since the retransmission of packets due to supervisory or executive processing, such as a TCP or the like, can be substantially reduced. Further, even when a UDP is used as an higher-level protocol, packet loss can be prevented or reduced.

Further, in specific embodiments, the use of techniques according to the present invention permit construction of a network system having a relatively high availability.

In specific embodiments according to the present invention, a relatively simple implementation can be achieved due to the simplification of mounting of hardware.

Further, in specific embodiments, packet loss can be reduced by shortening the time from the detection of a failure to the switching between line receivers. Accordingly, a network system of relatively high availability can be achieved.

According to the present invention, the same information is prepared in a plurality of packets, and the plurality of packets are transmitted to a plurality of physical lines. Thus, even when packet loss occurs, information can be effectively processed. It is also possible to aggregate a plurality of physical lines for relatively improved availability.

The preceding has been a description of the preferred embodiment of the invention. It will be appreciated that deviations and modifications can be made without departing from the scope of the invention, which is defined by the appended claims.

What is claimed is:

1. An apparatus for receiving a plurality of packets having the same contents sent from another apparatus through a plurality of physical lines that connect between the apparatus and the another apparatus, comprising:
- a line controller that controls packet flow over the plurality of physical lines;
- a plurality of mode flags, each mode flag associated with one of the plurality of physical lines, and for respectively storing either a primary or a secondary mode therein;
- a plurality of storage areas that store received packets;
- a plurality of line receivers receiving the plurality of packets having the same contents sent from the another apparatus through the plurality of physical lines; wherein at least one of the plurality of line receivers delivers received packets from one of the plurality of storage areas for forwarding if a mode flag corresponding to the at least one of the plurality of line receivers has a primary mode stored therein;
- a receiving line switching unit that monitors a presence of a failure of one of the plurality of physical lines corresponding to one of the plurality of mode flags storing a primary mode therein, and when a failure is detected, changes the one of the plurality of mode flags storing the primary mode therein to a secondary mode; and changes another of the plurality of mode flags storing the secondary mode therein to a primary mode; and thereupon
- compares each received packet stored in the received packet storage area corresponding to the mode flag changed to the secondary mode and each received packet stored in the received packet storage area corresponding to the mode flag changed to the primary mode; and receives a received packet equivalent to each packet lost due to the failure.

2. The apparatus of claim 1 wherein the line controller controls the plurality of physical lines in a first layer (physical layer) of an OSI reference model.

3. The receiving apparatus of claim 1 wherein each of the plurality of line receivers abandons received packets if a mode flag corresponding to the at least one of the plurality of line receivers has a secondary mode stored therein.

4. The apparatus of claim 1 wherein a protocol processor performs a protocol process in a third layer or higher of an OSI reference model.

5. The receiving apparatus of claim 1 further comprising a receiving line switching unit that monitors a presence of a failure of one of said plurality of physical lines corresponding to one of said plurality of mode flags storing a primary mode therein, and when a failure is detected, changes said one of said plurality of mode flags storing said primary mode therein to a secondary mode; and changes another of said plurality of mode flags storing said secondary mode therein to a primary mode.

6. An apparatus for receiving a plurality of packets having the same contents sent from another apparatus through a plurality of physical lines that connect between the apparatus and the another apparatus, comprising:
- a line controller that controls packet flow over the plurality of physical lines;
- a plurality of mode flags, each mode flag associated with one of the plurality of physical lines, and for respectively storing either a primary or a secondary mode therein;
- a plurality of storage areas that store received packets;
- a plurality of line receivers receiving the plurality of packets having the same contents sent from the another apparatus through the plurality of physical lines; wherein at least one of the plurality of line receivers delivers received packets from one of the plurality of storage areas for forwarding if a mode flag corresponding to the at least one of the plurality of line receivers has a primary mode stored therein; and
- a receiving line switching unit that monitors a presence of a failure of one of the plurality of physical lines corresponding to one of the plurality of mode flags storing a primary mode therein, and when a failure is detected, changes the one of the plurality of mode flags storing the primary mode therein to a secondary mode; and changes another of the plurality of mode flags storing the secondary mode therein to a primary mode; and thereupon
- compares each received packet stored in the received packet storage area corresponding to the mode flag changed to the secondary mode and each received packet stored in the received packet storage area corresponding to the mode flag changed to the primary mode.

7. The apparatus of claim 6 wherein the line controller controls the plurality of physical lines in a first layer (physical layer) of an OSI reference model.

8. The receiving apparatus of claim 6 wherein each of the plurality of line receivers abandons received packets if a mode flag corresponding to the at least one of the plurality of line receivers has a secondary mode stored therein.

9. The apparatus of claim 6 wherein a protocol processor performs a protocol process in a third layer or higher of an OSI reference model.

10. The receiving apparatus of claim 6 further comprising a receiving line switching unit that monitors a presence of a failure of one of said plurality of physical lines corresponding to one of said plurality of mode flags storing a primary mode therein, and when a failure is detected, changes said one of said plurality of mode flags storing said primary mode therein to a secondary mode; and changes another of said plurality of mode flags storing said secondary mode therein to a primary mode.

* * * * *